United States Patent [19]

Konstatin et al.

[11] Patent Number: 4,935,140
[45] Date of Patent: Jun. 19, 1990

[54] MEMBRANE AND PROCESS FOR PRODUCING THE MEMBRANE

[75] Inventors: Peter Konstatin, West Covina, Calif.; Hermann J. Gohl, Bisingen-Zimmern, Fed. Rep. of Germany; Maria T. Ohmayer, Bisingen, Fed. Rep. of Germany; Reinhold J. Buck, Alleshausen, Fed. Rep. of Germany; Claes-Ake Gullberg, Lund, Sweden

[73] Assignees: Gambro Dialysatoren KG; Gambro Lundia AB; Gambro, Inc., all of Sweden

[21] Appl. No.: 937,447

[22] Filed: Dec. 5, 1986

Related U.S. Application Data

[63] Continuation of Ser. No. 551,127, Nov. 14, 1983, abandoned.

[30] Foreign Application Priority Data

Nov. 16, 1982 [SE] Sweden ............... 82.06515-2

[51] Int. Cl.$^5$ .............................. B01D 71/06
[52] U.S. Cl. ..................... 210/500.23; 210/500.4; 210/500.43; 264/41
[58] Field of Search ....... 210/500.23, 500.43, 210/490, 500.33, 500.4; 264/209.1, 41

[56] References Cited

U.S. PATENT DOCUMENTS

| 3,957,651 | 5/1976 | Kesting | 210/440 |
| 4,075,108 | 2/1978 | Higley et al. | 264/41 X |
| 4,308,145 | 12/1981 | Higley et al. | 210/646 |
| 4,385,017 | 5/1983 | Joh et al. | 264/209.1 X |
| 4,482,514 | 11/1984 | Schindler et al. | 264/41 |
| 4,595,503 | 6/1986 | Schindler et al. | 264/41 X |
| 4,608,172 | 8/1986 | Goehl et al. | 210/500.33 |
| 4,686,044 | 8/1987 | Behnke et al. | 210/500.22 |

FOREIGN PATENT DOCUMENTS

| 0021630 | 12/1979 | European Pat. Off. |
| 0046817 | 9/1980 | European Pat. Off. |
| 2047161 | 1/1983 | United Kingdom |

OTHER PUBLICATIONS

Wendt et al., "Sieving Properties of Hemodialysis Membranes", Journal of Membrane Science, 5(1979) 23-49.

Israel Cabasso et al., "Polysulfone Hollow Fibers", Journal of Applied Polymer Science, vol. 20, 2377-2394 (1976).

*Primary Examiner*—Frank Spear
*Attorney, Agent, or Firm*—Lerner, David, Littenberg, Krumholz & Mentlik

[57] ABSTRACT

A membrane for hemodialysis is prepared by casting, extruding or spinning a solution of a polyether-polycarbonate block copolymer and a swelling agent having a molecular weight of about 1,000 to about 20,000 Daltons, then partially evaporating the solvent, gelling and washing. The membrane has a top cut-off value less than about 68,000 Daltons, and hence is substantially impermeable to albumin, but nonetheless provides high permeability to water and to other small molecules.

14 Claims, No Drawings

MEMBRANE AND PROCESS FOR PRODUCING THE MEMBRANE

This is a continuation of application Ser. No. 551,127 filed Nov. 14, 1983, now abandoned.

BACKGROUND OF THE INVENTION

This invention relates to a flat sheet, tubular, or hollow fiber membrane. The membrane is suitable for use, for example, in so-called simultaneous hemodialysis/hemofiltration. The invention also relates to a process for producing a membrane.

Examples of known hemodialysis membranes include the membranes described in, for example, U.S. Pat. Nos. 4,069,151; 4,075,108 and 4,308,145, while examples of known hemofiltration membranes include the membrane described in, for example, European Patent Publication No. 0 046 816.

Membranes which are suitable for so-called simultaneous hemodialysis/hemofiltration are also desirable. To be suitable for use in simultaneous hemodialysis/hemofiltration, a membrane should not only possess high hydraulic permeability, but also should simultaneously have high diffusive as well as high convective permeabilities to solutes to be separated. In other words, such a membrane should as much as possible have the membrane characteristics of a hemodialysis membrane and a hemofiltration membrane at one and the same time.

SUMMARY OF THE INVENTION

In accordance with the present invention, there is provided a flat sheet, tubular, or hollow fiber membrane which is particularly, though not exclusively, adapted for use in connection with so-called simultaneous hemodialysis/hemofiltration. The membrane has a hydraulic permeability to water (ultrafiltration rate) of from about 10 to about 100 ml/m$^2$/h/mmHg, preferably from about 30 to about 50 ml/m$^2$/h/mmHg, a diffusive permeability to chloride (Cl$^-$) of more than about 10 cm/sec$\times 10^{-4}$, preferably more than about 12 cm/sec$\times 10^{-4}$, a diffusive permeability to vitamin B$_{12}$ of more than about 2 cm/sec$\times 10^{-4}$, preferably more than about 3 cm/sec$\times 10^{-4}$, and a diffusive permeability to inulin of more than about 0.5 cm/sec$\times 10^{-4}$, preferably more than 1.0 cm/sec$\times 10^{-4}$. These characteristics in themselves describe the advantages of the membrane of the invention. Because of these characteristics, the membrane according to the present invention is not only suitable for use in so-called simultaneous hemodialysis/hemofiltration, but also for use in normal hemodialysis as well as in normal hemofiltration. Generally speaking, the membrane of the invention may be used whenever it is intended to separate a solute from a solution, irrespective of whether this separation is carried out by diffusive or convective solute transport through the membrane.

The membrane of the invention can be produced by a process in which a polymer solution containing a high molecular weight swelling agent is cast, extruded or spun to form a flat sheet, tube or hollow fiber material. The flat sheet, tube, or hollow fiber material is then exposed to partial evaporation of solvent prior to gelling. The exposed flat sheet, tube or hollow fiber material is gelled and subsequently washed and dried.

DETAILED DESCRIPTION OF THE INVENTION

As mentioned above, the membrane of the invention has a collection of characteristics as follows: a hydraulic permeability to water (ultrafiltration rate) of from about 10 to about 100 ml/m$^2$/h/mmHg, preferably from about 30 to about 50 ml/m$^2$/h/mmHg, a diffusive permeability to chloride (Cl$^-$) of more than about 10 cm/sec$\times 10^{-4}$, preferably more than about 12 cm/sec$\times 10^{-4}$, a diffusive permeability to vitamin B$_{12}$ of more than about 2 cm/sec$\times 10^{-4}$, preferably more than about 3 cm/sec$\times 10^{-4}$, and a diffusive permeability to inulin of more than about 0.5 cm/sec$\times 10^{-4}$, preferably more than 1.0 cm/sec$\times 10^{-4}$.

The cut-off value of the membrane can be set at any predetermined value depending on the intended use of the membrane. When the membrane is intended for use in extracorporeal treatment of blood, it is, however, desired to set the cut-off such that toxic uremic substances (metabolites) will freely pass through the membrane, while materials such as albumin (M$_w$=68,000 Daltons) are retained. A preferred cut-off value is about 50,000 Daltons.

Suitable polymers for preparing the membrane of the invention include polycarbonate block copolymers such as polyether-polycarbonate block copolymers and organopolysiloxane-polycarbonate block copolymers. Further examples of suitable polymers for the present membrane include polyacrylonitriles as well as modified polyacrylonitriles such as sulfonated polyacrylonitrile.

The most preferred polymer is a polyether-polycarbonate block copolymer. Preferably, the polyether-polycarbonate block copolymer is bisphenol A/polyalkylene oxide polycondensate containing from about 5 to about 35% by weight of polyalkylene oxide, preferably about 20%, and having the general formula:

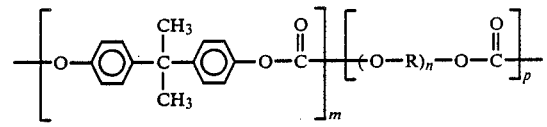

wherein R represents —CH$_2$CH$_2$—,

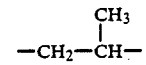

or combinations of —CH$_2$—CH=CH— and —CH=CH—, preferably —CH$_2$CH$_2$—, wherein m and p are integers selected such that the bisphenol A carbonate unit is about 95 to about 65% of the weight of the recurring unit and the alkylene oxide unit is about 5 to 35% of the weight of the recurring unit, and wherein n is an integer of from about 10 to about 220, preferably about 182. The molecular weight of the polymer is typically from about 50,000 to about 750,000, preferably from about 200,000 to about 500,000.

The thickness of the membrane of the invention may vary within wide limits and is usually within the range of from about 10 to about 60 microns. A preferred thickness is from about 25 to about 45 microns.

In the process of the invention, a polymer solution containing a high molecular weight swelling agent is cast, extruded or spun to form a flat sheet, tube or hollow fiber membrane material. The casting, extruding and spinning of polymer solutions is conventional and therefore will not be described here. The flat sheet, tube or hollow fiber material is then exposed to partial evaporation of solvent prior to gelling. Typically, from about 5 to about 30% by weight of solvent is evaporated. The exposed flat sheet, tube or hollow fiber is then gelled and subsequently washed and dried in conventional manner. The use of a high molecular weight swelling agent in the polymer solution forms a highly water and solute permeable porous structure, while the partial evaporation of solvent prior to gelling the membrane forms a denser layer which restricts the permeability of the membrane to solutes. These steps thus are very important in providing the advantageous characteristics of the membrane of the invention as discussed above.

By the term "high molecular weight" swelling agent in accordance with the present invention, we mean swelling agents having a molecular weight within a range of from about 1,000 to about 20,000 Daltons. A preferred molecular weight range is from about 3,000 to about 15,000 Daltons.

Suitable high molecular weight swelling agents for use in accordance with the present invention include any of the known swelling agents which have a high molecular weight, as defined above, which is soluble in the polymer solution, and which is removable in the gelation bath. Examples of high molecular weight swelling agents suitable for use in the process of this invention are polyethylene glycols, preferably polyethylene glycol having a molecular weight of 8,000 Daltons, and polypropylene oxide-polyethylene oxide block copolymers, such as Pluronic F 68 (BASF Wyandotte). Further examples of suitable swelling agents include dextran, inulin and polyvinylpyrrolidone.

The high molecular weight swelling agents are in general used in the process of the invention in amounts ranging from about 1 to about 8% by weight in the polymer solution (casting or spinning solution). Preferably, they are used in amounts of from about 2 to about 5% by weight.

Suitable polymers for use in the process of the invention include those mentioned above in connection with the membrane, namely, polycarbonbate block copolymers such as polyether-polycarbonate block copolymers and organopolysiloxane-polycarbonate block copolymers. Further examples of suitable polymers include polyacrylonitriles and modified polyacrylonitriles such as sulfonated polyacrylonitrile. Again, the most preferred polymer is a polyether-polycarbonate block copolymer, preferably, a bisphenol A/polyalkylene oxide polycondensate containing from about 5 to about 35% by weight of polyalkylene oxide, preferably about 20%, and having the general formula

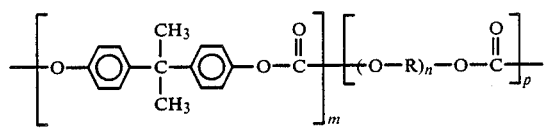

wherein R represents —CH$_2$CH$_2$—,

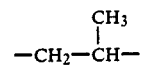

or combinations of —CH$_2$—CH=CH— and —CH=CH—, preferably —CH$_2$CH$_2$—, wherein m and p are integers selected such that the bisphenol A carbonate unit is about 95 to about 65% of the weight of the recurring unit and the alkylene oxide unit is about 5 to about 35% of the weight of the recurring unit, and wherein n represents an integer of from about 10 to about 220, preferably about 182.

The polymer solution is generally formed to have a viscosity within the range of from about 4,000 to about 50,000 cPs. A preferred viscosity range is from about 18,000 to about 25,000 cPs.

The following examples are intended to illustrate, but not to limit, the present invention.

EXAMPLE 1

A filtered polymer solution is prepared from 85.7% by weight of dioxolane, 12.25% by weight of polyether-polycarbonate block copolymer [prepared by reacting phosgene with a comonomer mixture of bisphenol A (80 weight percent) and polyethylene glycol (Carbowax) 8000 (20 weight percent)], and 2.05% by weight of polyethylene glycol ($M_w$=3,400). The polymer solution had a viscosity of 18,000 cPs and was extruded via a doctor blade onto a moving substrate. After evaporation of about 20% of the dioxolane, the extruded membrane was precipitated with a water bath, removed from the substrate, washed free of dioxolane and polyethylene glycol, stabilized in an ethanol/glycerol/water mixture, and dried with air.

The resultant membrane had the properties listed in Table 1 below:

TABLE 1

| | |
|---|---|
| Ultrafiltration rate: | 21 ml/m$^2$/h/mmHg |
| Diffusive permeability to chloride: | 13.0 × 10$^{-4}$ cm/sec |
| Diffusive permeability to B$_{12}$: | 5.0 × 10$^{-4}$ cm/sec |
| Diffusive permeability to inulin: | 0.8 × 10$^{-4}$ cm/sec |
| Thickness: | 28 microns |

EXAMPLE 2

A filtered polymer solution is prepared from 84.3% by weight of dioxolane, 12.1% by weight of polyether-polycarbonate block copolymer [prepared by reacting phosgene with a comonomer mixture of bisphenol A (80 weight percent) and polyethylene glycol (Carbowax) 8000 (20 weight percent)], and 3.6% by weight of polyethylene glycol ($M_w$=8,000). The polymer solution had a viscosity of 20,000 cPs and was extruded via a doctor blade onto a moving substrate. After evaporation of about 25% of the dioxolane, the membrane was precipitated in a water bath, removed from the substrate, washed free from dioxolane and polyethylene glycol, stabilized in a glycerol/water mixture, and dried in warm air.

The resultant membrane had the properties listed in Table 2 below:

TABLE 2

| | |
|---|---|
| Ultrafiltration rate: | 60 ml/m$^2$/h/mmHg |
| Diffusive permeability to chloride: | 13.8 × 10$^{-4}$ cm/sec |
| Diffusive permeability to B$_{12}$: | 5.2 × 10$^{-4}$ cm/sec |
| Diffusive permeability to inulin: | 1.7 × 10$^{-4}$ cm/sec |

TABLE 2-continued

| Thickness: | 45 microns |
|---|---|

EXAMPLE 3

A filtered polymer solution is prepared from 86.6% by weight of dioxolane, 12.2% by weight of polyether-polycarbonate block copolymer [prepared by reacting phosgene with a comonomer mixture of bisphenol A (80 percent weight) and polyethylene glycol (Carbowax) 8000 (20 weight percent)], and 1.2% by weight of Pluronic F 68 (BASF Wyandotte). The polymer solution had a viscosity of 22,000 cPs and was extruded via a doctor blade onto a moving substrate. After evaporation of about 20% of the dioxolane, the membrane was precipitated in a water bath, removed from the substrate, washed free of dioxolane and Pluronic F 68, stabilized in an ethanol/glycerol/water mixture, and dried with air.

The resultant membrane had the properties listed in Table 3 below:

TABLE 3

| Ultrafiltration rate: | 13 ml/m$^2$/h/mmHg |
|---|---|
| Diffusive permeability to chloride: | 12.1 × 10$^{-4}$ cm/sec |
| Diffusive permeability to B$_{12}$: | 4.6 × 10$^{-4}$ cm/sec |
| Diffusive permeability to inulin: | 1.7 × 10$^{-4}$ cm/sec |
| Thickness: | 28 microns |

EXAMPLE 4

In Table 4 below the effect of molecular weight of polyethylene glycol (PEG), used as swelling agent, on ultrafiltration rate of a membrane obtained in the process according to the present invention is illustrated:

TABLE 4

| Swelling Agent/ Molecular Weight | Ultrafiltration Rate (ml/m$^2$/h/mmHg) |
|---|---|
| PEG 1540 | 9 |
| PEG 3400 | 21 |
| PEG 8000 | 50 |
| PEG 18500 | 12 |
| PEG 20000 | 9 |

Table 4 shows the effect of equal amounts of polyethylene glycols of various molecular weights added to the polymer solution upon the ultrafiltration rate of the membrane obtained. A maximum can be observed for polyethylene glycol having a molecular weight of 8,000 Daltons.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

What is claimed is:

1. A flat sheet, tubular, or hollow fiber membrane comprising a polymer selected from the group consisting of polyether-polycarbonate block copolymers, said membrane having a top cut-off value of less than about 68,000 Daltons, a hydraulic permeability to water of between about 30 to about 50 ml/m$^2$/h/mmHg, a diffusive permeability to chloride ions of more than about 12×10$^{-4}$ cm/sec, a diffusive permeability to vitamin B$_{12}$ of more than about 3×10$^{-4}$ cm/sec, and a diffusive permeability to inulin of more than about 1.0×10$^{-4}$ cm/sec.

2. A membrane according to claim 1, having a top cut-off value of about 50,000 Daltons.

3. A membrane according to claim 1 or 2, having a thickness of from about 10 to about 60 microns.

4. A membrane according to claim 1 or 2, having a thickness of from about 25 to about 45 microns.

5. A process for producing a membrane comprising the steps of casting, extruding or spinning a solution containing a polymer selected from the group consisting of polyether-polycarbonate block copolymers, solvent and a swelling agent having a molecular weight of from about 1,000 to about 20,000 Daltons to form a flat sheet, tube or hollow fiber material; exposing the flat sheet, tube or hollow fiber material to partial evaporation of solvent; gelling the exposed flat sheet, tube or hollow fiber material; and washing and drying the gelled flat sheet, tube or hollow fiber material to provide a flat sheet, tubular, or hollow fiber membrane having a top cut-off value of less than about 68,000 Daltons, a hydraulic permeability to water of between about 10 and about 100 ml/m$^2$/h/mmHg, a diffusive permeability to chloride ions of more than about 10×10$^{-4}$ cm/sec, a diffusive permeability to vitamin B$_{12}$ of more than about 2×10$^{-4}$ cm/sec, and a diffusive permeability to inulin of more than about 0.5×10$^{-4}$ cm/sec.

6. A process according to claim 5, wherein the swelling agent has a molecular weight of from about 3,000 to about 15,000 Daltons.

7. A process according to claim 6, wherein the swelling agent is used in an amount of from about 1 to about 8% by weight.

8. A process according to claim 7, wherein the swelling agent is selected from the group consisting of polyethylene glycols, polypropylene oxide-polyethylene oxide block copolymers, dextrane, inulin, and polyvinyl-pyrrolidone.

9. A process according to claim 8, wherein the swelling agent is a polyethylene glycol having a molecular weight of about 8,000 Daltons.

10. A process according to claim 6, wherein the swelling agent is used in an amount of from about 2 to about 5% by weight.

11. A process according to claim 6, wherein the polymer solution has a viscosity of from about 4,000 to about 50,000 cPs.

12. A process according to claim 11, wherein the polymer solution has a viscosity of from about 18,000 to about 25,000 cPs.

13. A process according to claim 5, wherein said partial evaporation of solvent is conducted so as to evaporate about 5% to about 30% by weight of said solvent.

14. A membrane made by a process according to any one of claims 5, 6-10, 11, 12 and 13, having a hydraulic permeability to water of between about 30 to about 50 ml/m$^2$/h/mmHg, a diffusive permeability to chloride ions of more than about 12×10$^{-4}$ cm/sec, a diffusive permeability to vitamin B$_{12}$ of more than about 3×10$^{-4}$ cm/sec, and a diffusive permeability to inulin of more than about 1.0×10$^{-4}$ cm/sec.

* * * * *

UNITED STATES PATENT AND TRADEMARK OFFICE
CERTIFICATE OF CORRECTION

PATENT NO. : 4,935,140

DATED : June 19, 1990

INVENTOR(S) : Konstatin, et al

It is certified that error appears in the above-identified patent and that said Letters Patent is hereby corrected as shown below:

On the title page item [73];
Delete the present identification of assignees and substitute therefore --Gambro Dialysatoren KG (a corporation of the Federal Republic of Germany); Gambro, Inc. (a corporation of the State of Delaware); and Gambro Lundia AB (a corporation of Sweden)--.

Signed and Sealed this

Fourteenth Day of January, 1992

Attest:

HARRY F. MANBECK, JR.

*Attesting Officer*  *Commissioner of Patents and Trademarks*